United States Patent [19]

Okada

[11] Patent Number: 4,880,654

[45] Date of Patent: Nov. 14, 1989

[54] PROCESS FOR PREPARING SIMULATED MEAT

[76] Inventor: Minoru Okada, 4-31-16 Mejiro, Toshimaku, Tokyo, Japan

[21] Appl. No.: 219,887

[22] Filed: Jul. 14, 1988

Related U.S. Application Data

[63] Continuation of Ser. No. 944,187, Dec. 22, 1986, abandoned.

[51] Int. Cl.$^4$ .................... A23L 1/317; A23L 1/325; A23P 1/10
[52] U.S. Cl. .................................... 426/574; 426/104; 426/575; 426/643; 426/646
[58] Field of Search ............... 426/104, 574, 575, 643, 426/646

[56] References Cited

U.S. PATENT DOCUMENTS

| | | | |
|---|---|---|---|
| 3,093,483 | 6/1963 | Ishler et al. | 426/276 |
| 3,627,536 | 12/1971 | Arima et al. | 426/574 |
| 3,829,587 | 8/1974 | Tolstoguzov et al. | 426/250 |
| 3,891,776 | 6/1975 | Carpenter et al. | 426/574 |
| 4,362,752 | 12/1982 | Sugino et al. | 426/104 |
| 4,423,083 | 12/1983 | Shenouda | 426/574 |
| 4,548,823 | 10/1985 | Morimoto | 426/104 |
| 4,554,166 | 11/1985 | Morimoto | 426/574 |
| 4,579,741 | 4/1986 | Hanson et al. | 426/574 |
| 4,784,862 | 11/1988 | Wotherspoon | 426/575 |

FOREIGN PATENT DOCUMENTS

| | | | |
|---|---|---|---|
| 495353 | 1/1976 | Australia | 426/574 |

*Primary Examiner*—Donald E. Czaja
*Assistant Examiner*—Mary S. Mims
*Attorney, Agent, or Firm*—William W. Haefliger

[57] ABSTRACT

Fibrous particles resembling torn flakes of meat are prepared by mixing, kneading and beating an aqueous solution of soluble alginate and protein and/or starch with aqueous polyvalent cation gelling agent solution. The fibrous particles are typically mixed with meat paste and then shaped and cooked to produce a meat analog product having predetermined shape.

8 Claims, No Drawings

PROCESS FOR PREPARING SIMULATED MEAT

This is a continuation of application Ser. No. 944,187, filed Dec. 22, 1986, now abandoned.

BACKGROUND OF THE INVENTION

1. Field of Invention

This invention relates to a foodstuff having a fibrous structure analogous to that of meat, and a process for preparing same, using soluble alginate or alginates and protein and/or starch as starting material.

2. Description of Prior Art

Alginate-protein complex to produce shrimp or crab meat analog products have been produced from solutions containing both alginate salts and protein, as disclosed for example in U.S. Pat. Nos. 3,093,483; 3,627,536; 3,829,587; 4,362,752 and 4,548,823. In the processes disclosed in those references, however, the complex is processed as in U.S. Pat. No. 4,362,752 by a direct extrusion method in which an aqueous solution of alginate-protein is extruded directly into a gelling bath so as to produce fibrous materials resembling monofiliment of meat fibre.

U.S. Pat. No. 4,362,752 discloses a process in which a gel like mass is prepared by mixing soybean powder-alginate aqueous solution with calcium chloride solution and is crushed by a mill so as to be extruded therefrom.

Thus, prior to the present invention, the meat analog products using alginate-protein as a starting material were prepared by either direct or indirect extrusion methods. The extrudate prepared by such direct extrusion methods has a long but simple monofiliment structure which does not have an acceptable combination of texture, juiciness and chewiness resembling that of natural meat. The product produced by the indirect extrusion method consists of small particles with a three dimensional reticular structure of less than 0.5 mm in diameter. As such, it is too small to use directly as a meat analog. Also, the indirect extrusion method is time consuming and consists of two steps, i.e. preparation of gel and crushing of the gel as by a mill extruder.

SUMMARY OF THE INVENTION

It is an object of the present invention to provide a meat analog product and a process preparing same wherein aqueous solutions of soluble alginate plus protein and/or starch may be readily turned into fibrous torn flakes of meat analogs products having textural, juiciness and chewiness characteristics approximating those of natural meat of various animals such as fish, shrimp, lobster, crab, poultry and cattle. These and other objects of the present invention are achieved by mixing, kneading and beating both aqueous solution of soluble alginate plus protein and/or starch, together with an aqueous solution of a polyvalent cation gelling agent.

In accordance with a further object of the invention, films formed on the interfaces of both solutions are crushed, torn, folded and entangled into fibrous particles having a three dimensional reticular structure characterized by 20 to 100 mm length and 1 to 5 mm diameter. The fibrous particles resemble torn meat or flesh flakes of various animals. The fibrous particles may be further mixed with meat paste, the mixture then set by cooking to produce a meat analog having desired shape.

These and other objects and advantages of the invention, as well as the details of an illustrative embodiment, will be more fully understood from the following specification and drawings, in which:

DESCRIPTION OF THE PREFERRED EMBODIMENT

The aqueous starting materials of the present invention consist of the following components:

| Components | Weight % | Weight % Preferred Range |
| --- | --- | --- |
| Water | 75 to 98.5 | 82 to 95 |
| Protein and/or starch | 1 to 20 | 3 to 15 |
| Soluble alginate (sodium and/or potassium and/or ammonium) | 0.5 to 5 | 1 to 3 |

The soluble alginate together with protein and/or starch are used in the weight ratio, with respect to each other, of about 1:0.2 to 1:40.

The protein usable in these compositions is a heat coagulable protein including vegetable protein, such as soy protein isolate, and/or soy protein concentrate and/or animal protein such as egg albumin. The protein should not have a too high concentration of polyvalent cations used in the gelling solution, i.e. a concentration that would lead to gelation of alginates during the preparation or handling of the soluble alginate. Calcium casinate containing such cation is not suitable to be used.

The starch usable in these compositions is preferably water insoluble and of heat gelatinizable type such as raw, regular and modified starch. The useless starches are those which would have a good degree of solubility in cold water i.e. such as pregelatinized starch and dextrins.

Useful soluble alginates include sodium, potassium and ammonium alginates. Soluble alginates having a high molecular weight, as evidenced by a viscosity of about 200 to 1000 CPS (as one weight percent aqueous solution) are preferred. The use of a low molecular weight alginate on the other hand only enables realization of a desired texture in the analog product at a relative high level of alginate content.

The gelling agents used for an aqueous gelling solution include inorganic and organic salts with polyvalent cations which cause gellation of the soluble alginates. Such gelling agents (as for example have cations $Ca^{++}$ and $Al^{+++}$) and include salts such as calcium chloride, aluminum chloride, and also ammonium alum and potassium alum.

MIXING, KNEADING AND BEATING CONDITIONS

The soluble alginate-protein and/or starch solution of the present invention is typically mixed, kneaded and beaten with the gelling solution in a tank or mortar, by means of any of a conventionally employed mixing and kneading device or devices as used in the art of making meat paste and flour dough at room temperature.

When solutions of the soluble alginate and protein and/or starch and of the gelling agent contact each other, a gel is immediately formed at the interface between the components. The mass of alginate-protein and/or starch solution is covered with insoluble alginate gel film and forms a bag containing unreacted soluble alginate. As a result of subsequent mixing, kneading and beating, the bag is mechanically ruptured, and the contained unreacted soluble alginate solution flows out and contacts the surrounding gelling solution. New alginate bags are formed and ruptured, whereas the insoluble surface films of the initial and subsequently formed bags remain. Such formation and rupture of alginate bags proceeds during mixing, kneading and beating, and the formation of insoluble gel films continues until all the soluble alginate reacts with the gelling agents. The insoluble gel film thus formed is 1 to 10 cm in both width and length and 0.05 to 0.5 mm in thickness. During further mixing, kneading and beating, the insoluble gel films are continuously folded, twisted and entangled with each other and form torn fibrous particles in strand form resembling torn flakes of meat. The fibrous particles in strand form comprise entangled fibres of various shapes and sizes and which are between 10 to 50 mm in length and between 1 and 5 mm in diameter. The shapes and sizes are controlled by the rate of mixing, kneading and beating; thus, when alginate-protein and/or starch solution and the gelling solution contact each other for a longer period of time due to a relatively slower rate of mixing, kneading and beating, greater thicknesses and longer fibrous particles are obtained. On the other hand, faster rates of mixing, kneading and beating produce particles that are smaller in cross section and shorter. After mixing, kneading and beating, the fibrous particles are easily separated from the excess reaction solution and dewatered, by compression of the mass of particles and solution pour-off. It is preferable to cook the resultant fibrous particles under such conditions as necessary to coagulate the protein and also to gelatinize to starch in order to improve their eating quality and to set themselves. Thus, the moist particles are typically kept at between 70° C. and 100° C. for between 20 and 60 minutes.

TEXTURE AND FLAVOR OF THE FIBROUS PARTICLES

When the alginous solution of soluble alginate alone is mixed with the gelling solution, i.e., without addition of protein and/or starch, fibrous particles are difficult to prepare and such particles as are produced are mainly globular in shape. Even if the fibrous particles are made, they tend to have a dry, firm texture, and chewiness and masticatability are insufficiently present. The addition of at least one protein and/or starch to the soluble alginate enhances formation of desired fibrous particles and it increases, at the same time, the yield of such particles.

The addition of some starch improves the juiciness of the fibrous particles but the addition of a relatively large amount of starch, such as more than 10 weight per cent of the total mass lowers the chewiness of the products as they become sticky. The addition of some protein imparts a soft and juicy texture to the fibrous particles but the addition of relatively large amounts of protein, such as more than 10 weight percent of the total mass, undesirably lowers the textural strength of the product. An appropriate amount of both soluble starch and soluble protein is preferable to produce fibrous particles of excellent texture with good yield; and in this regard, the desired weight percent for best results are: between 3 and 15 weight percent starch and/or protein.

The concentration of gelling agent determines the moisture content of the fibrous particles and also the firmness and juiciness of their texture. An increase in polyvalent cation in the gelling solution without changing the other conditions decreases the water content of the fibrous particles and results in a firm and dry textured product and also low in yield. Presence of the gelling agent in a relatively high concentration imparts a bitter taste to the product. A decrease in concentration of gelling agent has the opposite effect, when lower levels of gelling agents are used, very soft products are formed and separation of the products from the reaction solution is very difficult even by applying very high compression. For best results, the weight percent of gelling agent, as a percent of total mass, is between 0.5 and 2.0%.

When appropriate amounts of flavoring, coloring agents and/or seasonings are added to the soluble alginate and protein and/or starch solution, fibrous particles with excellent flavor, color and taste are produced. The fibrous particles can be eaten, as produced; or, the particles may replace torn, i.e. ground, meat flakes in various dishes or recipes.

SHAPING AND HEAT SETTING

To prepare shaped analog products according to the present invention, the cooked or uncooked fibrous particles are typically mixed with a meat paste binder in a weight ratio to each other of about 1:0.2 to 1:5 (i.e. particles to binder). The meat paste binder is prepared according to the conventional method of surimi based products 10 and meat sausage manufactures. See for examples U.S. Pat. Nos. 4,557,940; 4,559,236; and 4,622,234. Minced meat of surimi (washed, purified, minced meat of fish) or poultry, or cattle is ground and mixed with appropriate amounts of salt, seasonings, flavor, color, starch and other desirable ingredients until a viscous paste is formed. It is preferable to mix about 1 part of soft fibrous particles with about 1 part in weight of meat binder for crab analog production; about 1 part of moderate soft fibrous particles with about 1 part of meat binder for shrimp analog; about 1 part of of moderate firm fibrous particles, about 0.5 part of meat binder for lobster analog; and about 1 part of very firm fibrous particles with about 0.3 part meat binder for beef jerky analog.

The mixtures of the fibrous particles and meat pastes are shaped to form the desired products. For shrimp and lobster analogs, it is preferable to place the mixture into a mold which has the shape of the product. For beef jerky analog, the mixture is spread onto a sheet. The shaped mixture is then cooked to set as by steaming, broiling, deep fat frying or by microwave heating.

The following examples are illustrative of present invention and are not intended as limiting the scope thereof:

EXAMPLE 1.

An alginate-protein and/or starch aqueous solution was prepared by dissolving 20 gs of sodium alginate, 25 gs of potato starch and 50 gs of egg white powder in 1,000 ml of water in an electric blender. A gelling aqueous solution was prepared by dissolving 5 gs of calcium chloride in 1,000 ml of water. The two aqueous solutions were mixed together, and kneaded and beaten by a Hobart mixer for 3 minutes at selected speed number 2, until fibrous particles were formed. The fibrous particles were separated from the remanent aqueous solution and were pressed in a cheese cloth to squeeze out excess reaction solution. The fibrous particles were then cooked in a microwave oven for 3 minutes. The cooked fibrous particles had solids content of 15 weight percent and a retained moisture content of 85 weight percent. The cooked fibrous particles were then manually disentangled to loose fibre form. The fibers were between 10 and 50 mm long, and between 1 and 5 mm in diameter. The analog product thus obtained closely resembled shredded meat of natural blue crab, with respect to its appearance and also its eating qualities.

EXAMPLE 2.

The same process as that employed in Example 1 was employed herein except that, an aqueous solution of 2 weight percent potassium alginate, 5 weight percent corn starch, and 1 weight percent calcium chloride (balance water) was used. After separated fibrous particles were dewatered, their solids content was 13% and moisture content was 77%. The dewatered fibrous particles were mixed with fishmeat paste in a ratio of 1 part by weight fibrous particles to 1 part by weight fish meat paste, in a ribbon mixer. The fish meat paste was preliminary prepared by grinding Alaska Pollock-frozen surimi with 2.5% by weight of salt, 5% by weight of waxy corn starch, 3% by weight of shrimp extractives and 0.01% by weight of shrimp aroma, in a silent cutter.

The mixture of fibrous particles and the fish meat paste was then placed in a shrimp mold and cooked for 0 minutes in a gas oven. The thus shaped shrimp analog product was taken out and cooked again by steaming, to heat set completely. This analog product closely resembled natural shrimp with respect to its outside appearance, inside texture and also its eating qualities.

EXAMPLE 3.

The same process as that employed in Example 1 was employed herein except that the gelling solution contained 1.5 gs of calcium chloride in 1,000 ml of water. The resulting fibrous particles contained 75% weight moisture. The fibrous particles were then mixed with fish meat paste in a ratio of 2 weight parts of fibrous particles to 1 weight part of fish paste. The fish paste was prepared by the same process as that employed in Example 2, except that lobster extractives and lobster aromas were used for flavoring. The resulting mixture was shaped into a loaf form 3 cm in diameter and steam cooked. The product closely resembled natural lobster chunks with respect to appearance and also as to its eating qualities.

EXAMPLE 4.

The same process as that of Example 1 was employed herein, except that alginate-protein and starch solution was formed from 3 weight percent of sodium alginate, 3 weight percent of regular commercial corn starch, 2.5 weight percent of egg white powder, 2.5 weight percent of soy protein isolates, 3 weight percent of beef extractives, and 0.5% of caramel. A 2 weight percent solution of calcium chloride was used as a gelling solution. The balance of each solution was water.

The resulting fibrous particles had brown color and beef flavor. The particle moisture content was 71%. The fibrous particles were mixed with beef paste in a ratio of 3 parts of fibrous particles to 1 part, by weight, of beef paste. (The beef paste was prepared by grinding beef with 2% by weight of salt, 0.3% by weight of tripolyphosphate, 3% by weight of corn starch, 0.2% by weight of MSG and 2 weight percent of soy sauce, the weight balance being beef).

The mixture was spread into a sheet of 4 mm thickness, dried with hot air until its moisture content reduced to 25 weight percent and slit to form pieces 2 cm in width and 7 cm in length. The resulting product pieces had the same good qualities as those of beef jerky with respect to its appearance, texture and eating qualities.

EXAMPLE 5.

The same procedure as Example 1 was employed herein except that the alginate-protein solution was formed from 2.5 weight percent of sodium alginate and 3 weight percent of regular wheat starch.

A 0.7 weight percent solution of calcium chloride was used as a gelling solution. The balance of each solution was water.

The resulting fibrous particles were mixed with surimi paste in a ratio of one part of fibrous particles to one part by weight of surimi paste. (The surimi paste was prepared by grinding Alaska pollock surimi with 2.5% by weight of salt, 3% by weight of crab extractives, 0.01% by weight of crab aroma, 5% by weight of modified corn starch, and 30% by weight of water).

The resulting mixture was extruded into a cylinder of 2 cm in diameter and 40 cm. long, and heat set by steaming after the upper part of the cylinder surface was colored with an artificial crab solution. The heat set cylinder was cut into chunk forms of 2 cm. width. The product closely resembled natural king crab leg chunks with respect to appearance and also as to its eating quality.

EXAMPLE 6.

The same process as that of Example 1 was employed herein except that alginate-starch solution was formed from 2.5 weight percent of sodium alginate, 5 weight percent of modified tapioca starch and 3 weight percent of chicken extractives. A 2 weight percent solution of calcium gluconate was used as a gelling solution. The balance of each solution was water.

The resulting fibrous particles were mixed with chicken paste in a ratio of 3 parts of fibrous particles to 2 parts, by weight, of chicken paste. (The chicken paste was prepared by grinding deboned chicken mince with 2% by weight of salt and 0.5% by weight of hydrolyzed vegetabled protein, HVP, the weight balance being chicken). The mixture was shaped into nugget form 30 mm x 25 mm x 8 mm in size, battered and breaded, and deep fat fried. The product closely resembled commercial chicken nuggets with respect to appearance and also as to its eating quality.

EXAMPLE 7.

The same process as that of Example 1 was employed herein except that the alginate protein solution was formed with 3 weight percent of sodium alginate; 5 weight percent of serum albumin, 3 weight percent of salmon extractives and 0.01% of artificial salmon color. A 1.5 weight percent solution of calcim chloride was used as a gelling solution. The balance was water.

The resulting fibrous particles had salmon pink color and salmon flavor. The fibrous particles were mixed with surimi paste in a ratio of 3 parts of fibrous particles to 1 part, by weight, of surimi paste. (The surimi paste was prepared by grinding Alaska pollock surimi with 2% by weight of salt, 3% by weight of regular corn starch, 0.2% by weight of MSG, 0.005% artificial salmon color, and 0.01% by weight of liquid hickory smoke, the weight balance being surimi).

The mixture was spread into a sheet of 4 mm thickness, dried with hot air until its moisture content reduced to 25 weight percent and split to form pieces 2 cm in width and 1 cm in length. The resulting product pieces had the same good qualities as those of salmon jerky with respect to its appearance, texture and eating quality.

EXAMPLE 8.

The same procedure as that of

Example 1 was employed here, except that the alginate-protein solution was formed with 3 weight percent of sodium alginate, 5 weight percent of lactalbumin, 10 weight percent of soybean oil, 3 weight percent of beef extractives and 0.5 weight percent of caramel. A 2 weight percent solution of calcium gluconate was used as a gelling solution. The balance of each solution was water.

The resulting fibrous particles had brown color and beef flavor. The fibrous particles were mixed with beef paste in a ratio of 3 parts of fibrous particles to 2 parts, by weight, of beef paste. (The beef paste was prepared by grinding beef with 2% by weight of salt, 0.2% by weight of sodium tripolyphosphate, and 0.3% by weight of HVP, the balance of the weight being beef).

The mixture was shaped into a thick disk form of 1 cm in diameter, 1.2 cm. in height, and fried. The resulting product closely resembled beef hamburger with respect to appearance and also as to its eating quality.

I claim:

1. A process for preparing edible fibrous particles simulating the torn flakes of meat comprising the steps of:
    (a) preparing an aqueous solution of soluble alginate and a substance selected from the group consisting of protein and starch and mixtures thereof said aqueous solution comprising 0.5 to 5 weight percent of soluble alginate, and 1 to 20 weight percent of at least one of starch and protein, said soluble alginate selected from the group consisting of sodium alginate, potassium alginate and ammonium alginate,
    (b) mixing, kneading and beating said aqueous solution together with a subsequently added aqueous gelling solution, at room temperature thereby to form fibrous particles, and further mixing said particles then,
    (c) separating the fibrous particles from the resulting solution and removing excess water therefrom by compression, and
    (d) cooking the fibrous particles at between 70° and 100° C. for between 20 to 60 minutes to heat set same,
    (e) said particles having the shape of an entangled mass of torn threads each being between 10 to 50 mm in length and 1 to 5 mm in diameter,
    (f) said aqueous solution of soluble alginate and at least one of protein and starch, and said aqueous gelling solution, being employed in volume ratio to each other of about 1:05 to 1:2.

2. A process as in claim 1 in which said protein is heat coagulable protein selected from the group consisting of egg albumin, serum albumin, soy protein isolate and soy protein concentrate.

3. A process as in claim 1 in which said starch is heat gelatinizable starch selected from the group consisting of native and modified edible starch.

4. A process as in claim 3 in which said aqueous gelling solution comprises about 0.1 to 1 weight percent based on the cation content, of at least one compound of $Ca^{++}$ and $Al^{+++}$.

5. A process as in claim 4 in which said compound is selected from the group consisting of calcium acetate, calcium lactate, calcium gluconate, calcium chloride, aluminum chloride, ammonium alum and potassium alum.

6. A process for preparing of meat with shape of whole meat or chunk meat of fish, crab, shrimp, lobster, poultry or cattle, or with shape of jerky, comprising the steps of:
    (a) preparing a meat paste,
    (b) preparing edible fibrous particles, in accordance with claim 1,
    (c) mixing said edible fibrous particles and said meat paste in a weight ratio to each other of about 1:0 2 to 5,
    (d) shaping said mixture into predetermined size and shape,
    (e) cooking said shaped mixture to heat set the mixture.

7. A process of claim 6 in which the meat paste is prepare by grinding and mixing meat with salt and at least one of the following: flavoring, seasoning, coloring agent, starch and heat coagulable protein.

8. A process of claim 7 in which said meat is selected from the group consisting of meat of fish, shrimp, crab, lobster, poultry and cattle.

* * * * *

UNITED STATES PATENT AND TRADEMARK OFFICE
CERTIFICATE OF CORRECTION

PATENT NO. : 4,880,654

DATED : November 14, 1989

INVENTOR(S) : Minoru Okada

It is certified that error appears in the above-identified patent and that said Letters Patent is hereby corrected as shown below:

Column 8, lines 38 and 39, delete "paste in a weight ratio to each other of about 1:0 2 to 5," and substitute --paste in a weight ratio to each other of about 1:0.2 to 1:5--

Signed and Sealed this

Second Day of October, 1990

Attest:

HARRY F. MANBECK, JR.

*Attesting Officer*  *Commissioner of Patents and Trademarks*